United States Patent [19]
Sheppard

[11] Patent Number: 5,810,110
[45] Date of Patent: Sep. 22, 1998

[54] TANDEM POWER STEERING SYSTEM WITH HEAT SINK

[75] Inventor: Peter H. Sheppard, Hanover, Pa.

[73] Assignee: R. H. Sheppard Co., Inc., Hanover, Pa.

[21] Appl. No.: 747,065

[22] Filed: Nov. 8, 1996

[51] Int. Cl.[6] .................................................. B62D 5/06
[52] U.S. Cl. .......................................... 180/432; 180/441
[58] Field of Search .................................. 180/417, 432, 180/433, 441; 91/508, 510, 520; 92/144

[56] References Cited

U.S. PATENT DOCUMENTS

| | | | |
|---|---|---|---|
| 1,647,404 | 11/1927 | Gehrig | 180/432 |
| 1,938,745 | 12/1933 | Eaton et al. | 180/432 |
| 3,434,282 | 3/1969 | Shelhart | 60/52 |
| 3,727,404 | 4/1973 | Brewer | 60/430 |
| 3,730,260 | 5/1973 | Raymond | 165/27 |
| 3,772,896 | 11/1973 | Rao | 62/79 |
| 3,822,759 | 7/1974 | Sheppard | 180/417 |
| 3,826,328 | 7/1974 | Sheppard | 180/417 |
| 3,848,693 | 11/1974 | Sheppard | 180/417 |
| 3,954,148 | 5/1976 | Sheppard | 180/432 |
| 4,410,059 | 10/1983 | Nakayama et al. | 180/143 |
| 4,476,677 | 10/1984 | Hanshaw | 60/328 |
| 4,765,427 | 8/1988 | Yonker | 180/143 |
| 4,922,996 | 5/1990 | Rees | 165/1 |
| 5,335,494 | 8/1994 | Benko et al. | 60/428 |
| 5,427,195 | 6/1995 | Paul et al. | 180/308 |
| 5,501,184 | 3/1996 | Engelen et al. | 123/41.29 |
| 5,513,490 | 5/1996 | Howell et al. | 60/327 |

OTHER PUBLICATIONS

R.H. Sheppard Co., Inc., "Sheppard Power Steering" Service Catalog 0832, cover and p. 53 (Feb., 1983).
R.H. Sheppard Co., Inc., drawing "92 Series Slave Gear" (Feb., 1983).
R.H. Sheppard Co., Inc., "Sheppard Power Steering Service Manual" (Jul., 1995) 1000595/7–95/8M.

Primary Examiner—Kevin Hurley
Attorney, Agent, or Firm—Thomas Hooker, P.C.

[57] ABSTRACT

A power steering system for on-the-road and off-the-road vehicles includes a positive displacement hydraulic power steering pump, a master power gear with a rotary valve and a slave power gear mounted in tandem with the master power gear. Heated return hydraulic fluid from the master power gear flows through a heat transfer passage in the slave power gear and is cooled.

15 Claims, 4 Drawing Sheets

5,810,110

TANDEM POWER STEERING SYSTEM WITH HEAT SINK

FIELD OF THE INVENTION

The invention relates to a power steering system for on-the-road and off-the-road vehicles, particularly a steering system including a hydraulic power steering pump and a master power gear and a slave power gear in tandem.

DESCRIPTION OF THE PRIOR ART

Conventional tandem power steering systems for on-the-road and off-the-road vehicles include a high pressure positive displacement hydraulic pump and master and slave power gears. The master power gear receives hydraulic fluid from the pump. The pump is rotated at a speed directly proportional to the rotational speed of the vehicle engine. Typically, a gear or splined coupling on the input shaft of the pump is rotated by a coupling attached to the gear train of the engine. As a result, the volume of hydraulic fluid supplied to the master power gear by the hydraulic pump is dependent upon the speed of the vehicle engine and is independent of the steering input supplied to the master power steering gear by the vehicle operator and is independent of the speed of the vehicle.

Conventional tandem power steering systems include a rotary valve on the master power steering gear. This valve is connected to a valve actuation shaft joined to the steering wheel of the vehicle. Rotation of the steering wheel rotates the actuation shaft to shift the valve. When the vehicle driver does not provide steering input and the actuation shaft is motionless, hydraulic fluid flows through the valve, there is pressure developed by the resistance through the valve and, as a result, heat is generated. This heat increases the temperature of the hydraulic fluid flowing through the rotary valve and heats the master power steering gear adjacent to the rotary valve.

When the vehicle steering wheel is turned, the actuation shaft is rotated and hydraulic fluid supplied to the master power gear is diverted from the valve and flowed to one side of the piston in the master power gear and also to the corresponding side of the piston in the slave power gear to provide power steering assist for turning the vehicle wheels. Safety standards require that the power steering system be operational and ready to provide steering assistance at all times when the vehicle engine is running.

The engines of vehicles with tandem power steering systems may be operated at high rpm, sometimes against the engine governor, for long periods of time without steering input. This occurs when the vehicle is moving in a straight direction, without turning, and when the vehicle is stationary and the engine is used to pump off a cargo or for purposes other than propelling the vehicle. During these periods, the power steering pump flows large volumes of high pressure hydraulic fluid through the rotary valve with the release of large amounts of heat as the fluid is forced through the stationary valve. This heat increases the temperature of the fluid and heats the master power gear adjacent the rotary valve. The temperature increase may be sufficient to degrade the performance of the steering system. Elevated temperature may degrade the seals of the steering gears and pump. Additionally, elevated temperatures may cause internal and external leakage and seriously reduce the performance and durability of the system.

In conventional tandem power steering systems, heat may be extracted from the hydraulic fluid flowing from the master power gear to the reservoir by providing a stand alone heat exchanger, much like the radiator or oil cooler in an automobile, in the return line. The hydraulic fluid heated during flow through the stationary rotary valve flows through the heat exchanger and is cooled. The heat exchanger is an expensive item and must be specially installed in the vehicle. Further, proper installation requires that the heat exchanger be located where sufficient air flow is available to extract heat and cool hydraulic fluid. Sometimes it is difficult to locate a stand alone heat exchanger in a crowded engine compartment of a vehicle using a tandem power steering system.

SUMMARY OF THE INVENTION

The invention is an improved tandem power steering system in which the return hydraulic fluid line running from the rotary valve in the master gear to the hydraulic fluid reservoir includes a heat transfer passage extending along the length of the cylinder body of the slave power gear. The passage is independent of the hydraulic fluid passage in the slave gear. Heated hydraulic fluid flowing through the passage transfers heat to the slave power gear and is cooled. This heat flows through the slave gear, to the mounting frame on the vehicle and, ultimately, to atmosphere. The withdraw of heat from the hydraulic fluid as it flows through the transfer passage cools the hydraulic fluid and prevents the power steering system from becoming sufficiently hot to degrade the components of the power steering system and reduce its performance and durability.

The heat transfer passage is located in the center of a longitudinal ridge extending along the length of the body of the slave gear. The ridge is an integral part of the metal slave gear body. The passage extends between two ports formed in end caps mounted on the body so that the return hydraulic fluid from the master power gear flows to the slave gear, through an end cap, along the passage in the ridge and through the opposite end cap and then back to the reservoir. The relatively long, straight passage assures that the surrounding metal in the slave gear is exposed to the high temperature hydraulic fluid for sufficient time to extract heat from the fluid and flow the heat away from the passage. The passage does not impede the return flow of the hydraulic fluid and does not cause back pressure.

The relatively small ridge protects outwardly a short distance from the body of the slave gear and does not occupy appreciable additional space in the vehicle engine compartment or need be located in an air stream. The ridge is located on the body to avoid contact with adjacent components in the engine compartment.

The ridge and bore are relatively inexpensive to manufacture and are considerably less expensive than the conventional stand alone oil cooler now used to remove heat from hydraulic fluid in tandem power steering systems. Further, the ridge is virtually indestructible, being formed from thick and strong metal. In contrast, stand alone oil coolers are relatively delicate and occupy valuable engine compartment space.

Other objects and features of the invention will become apparent as the description proceeds, especially when taken in conjunction with the accompanying drawings illustrating the invention, of which there are 4 sheets and two embodiments.

DESCRIPTION OF THE PREFERRED EMBODIMENTS

Figure 1:
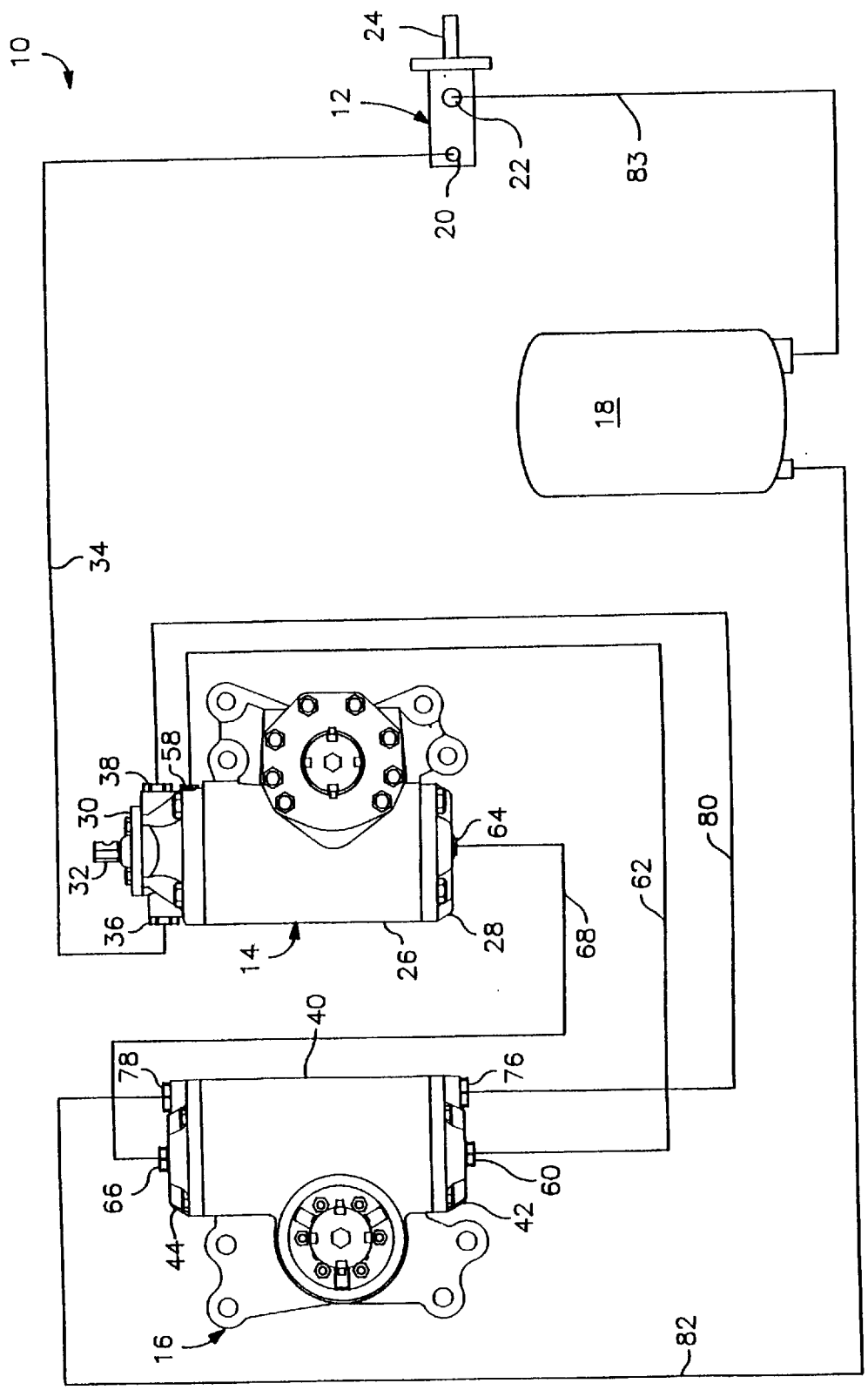
FIG. 1 is a diagrammatic view of a tandem power steering system according to the invention.
Figure 2:
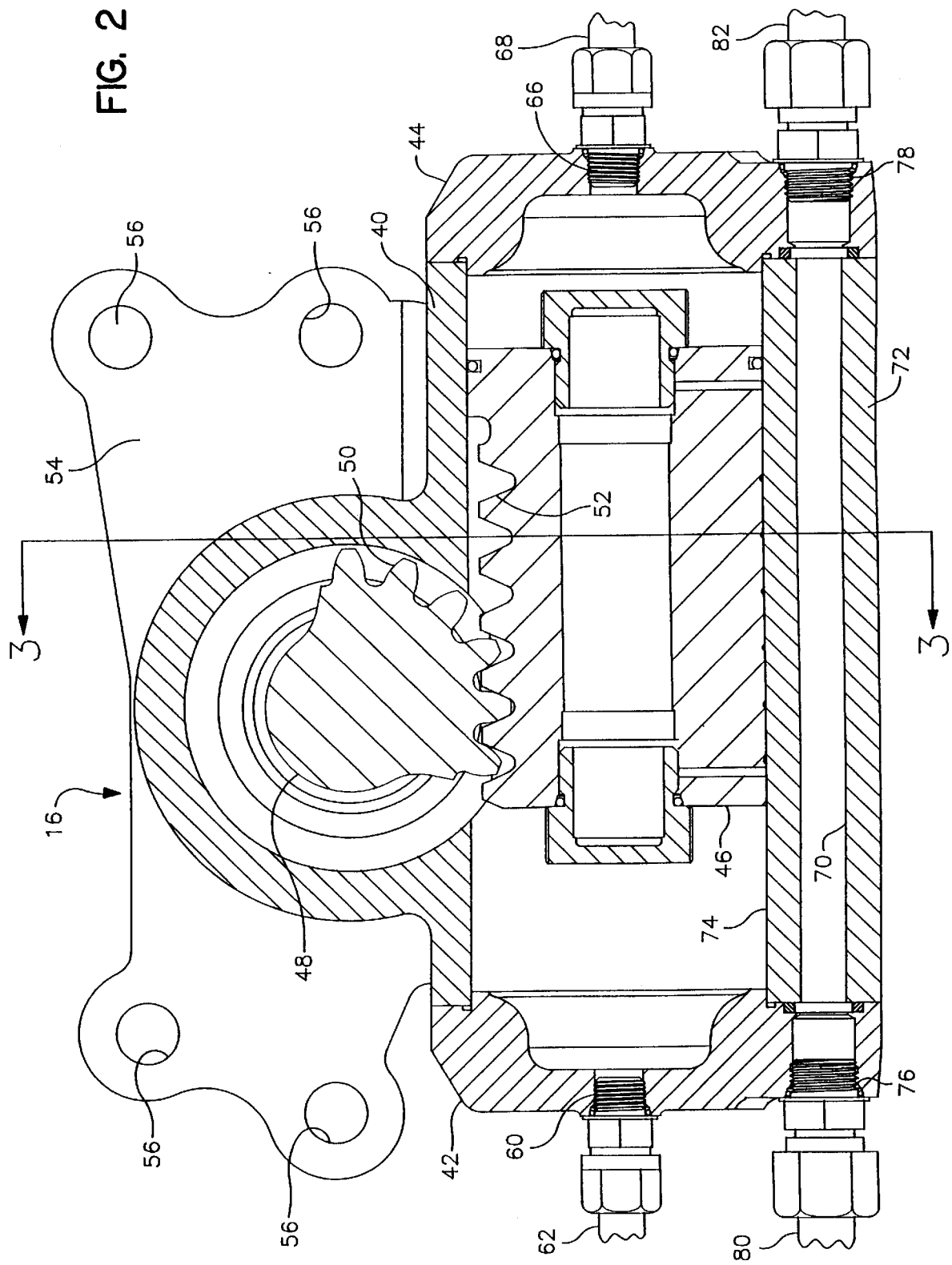
FIG. 2 is a sectional view through a slave power steering gear used in the steering system.
Figure 3:
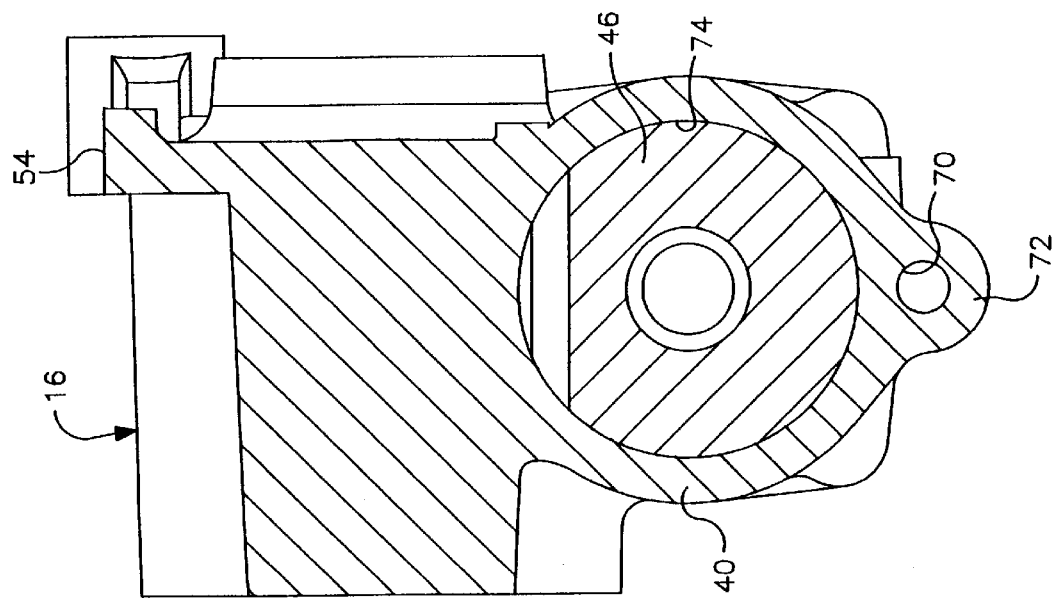
FIG. 3 is a sectional view taken along line 3—3 of FIG. 2.

FIGS. 1–3 illustrate a first embodiment tandem power steering system of the type used to rotate the steering wheels of a vehicle, typically a truck, tractor, bus or other large over-the-road or off-the-road vehicle. The system includes a conventional power steering pump 12, a master power steering gear 14, a slave power steering gear 16, and a hydraulic fluid reservoir 18. The pump 12 includes a high pressure outlet port 20, a low pressure inlet port 22 and a rotary drive shaft 24. The drive shaft 24 is connected to the vehicle engine, conventionally through direct drive coupling, and is rotated at a speed proportional to the rotational speed of the engine. Pump 12 is of a positive displacement type which flows high pressure hydraulic fluid from port 20. Typically, pump 12 has within its body a flow control to regulate the output of hydraulic fluid. However, the positive displacement nature of the pump causes large quantities of hydraulic fluid to be bypassed at high engine RPM within the pump, generating heat. Additionally, the pump has to be flow governed to provide a flow sufficient to provide an effective rate of steering for the master and slave gears.

The master power steering gear 14 is of conventional design and includes a metal piston body 26 with a piston confined within a body, an end cap 28 at one end of the body and a bearing cap 30 at the opposite end of the body. Rotary actuation shaft 32 is supported by bearing cap 30 and includes an inner end which engages the piston in body 26. A conventional rotary metering valve is mounted in bearing cap 30 and is actuated by rotation of actuation shaft 32.

High pressure hydraulic line 34 extends from power steering pump outlet port 20 to bearing cap high pressure inlet port 36 to supply high pressure hydraulic fluid to the rotary valve in the bearing cap. The vehicle steering wheel is connected to the actuation shaft 32 so that the shaft is rotated in response to steering input. High pressure hydraulic fluid supplied to the rotary valve is either flowed to move the pistons in the master and slave gears in response to steering input or is flowed through the valve and out the low pressure outlet port 38 in the bearing cap when there is no steering input. High pressure hydraulic fluid flowed through the valve and out port 38 passes through narrow metering edges, loses pressure and releases heat. The released heat increases the temperature of the fluid and the bearing cap.

The master power steering gear includes a conventional rotary output shaft with a sector gear mounted on the end of the output shaft. The sector gear engages a rack on the piston in body 26. The output shaft is connected to the vehicle steering system by a pitman arm mounted on the free end of the shaft, to rotate the vehicle front wheels in response to rotation of the actuation shaft 32.

Slave power steering gear 16 includes a metal piston body 40, end caps 42 and 44 and a piston 46 mounted in a bore inside body 40. The slave cylinder also includes a rotary output shaft 48 with a sector gear 50 which is meshed with rack 52 on piston 46, such that pressure shifting of the piston 46 in the bore rotates the output shaft. A pitman arm is mounted on the free end of shaft 48 and is connected to the vehicle steering linkage to assist in rotating the vehicle front wheels in response to rotation of actuation shaft 32. Body 40 includes a metal mounting plate 54 with bores 56 to facilitate mounting the slave gear on a support member of the vehicle by use of bolts extending through the bores. When plate 54 is secured against the support member heat supplied to the slave gear body flows to the support member and is dissipated by radiation from both the gear and the vehicle.

Hydraulic fluid port 58 in master gear end cap 30 communicates with the rotary valve and the end of the piston bore in body 56 adjacent the bearing cap. Port 58 is connected to hydraulic fluid port 60 in the slave cylinder end cap 42 by hydraulic fluid line 62. Port 60 communicates to the adjacent end of the bore in cylinder body 40, as illustrated in FIG. 2. Hydraulic fluid port 64 in master gear end cap 28 communicates with the adjacent end of the cylinder in body 26 and a passage to the rotary valve. Port 60 is connected to hydraulic fluid port 66 in slave gear end cap 44 by hydraulic fluid line 68.

A non-restrictive cylindrical heat transfer passage 70 is formed through the center of a ridge 72 which projects outwardly from metal cylinder body 40 and extends along the length of the body between the end caps 42 and 44. The thickness of body 40 at ridge 72 is about three times the thickness of the body away from the ridge. The diameter of passage 70 is approximately equal to the thickness of the metal in the ridge surrounding the passage. See FIG. 3. As a result, passage 70 is surrounded by metal having a thickness about equal to the diameter of the passage and about equal to the thickness of the wall away from the ridge. This thick surrounding body of metal is an effective heat sink which absorbs heat from hydraulic fluid flowed through passage 70.

Passage 70 extends along the length of the cylinder bore 74 in body 40. The ridge 72 assures that the heat transfer passage 70 is located a distance outwardly from cylinder bore 70 approximately equal to the minimum thickness of body 40 so that the heat transfer passage does not weaken the body. Ridge 72 and bore 70 are located across cylinder bore 74 from the output shaft 48, as indicated in FIG. 2. The ridge is located in this position in the first embodiment in order to clear parts of the vehicle when the slave gear 16 is mounted on the vehicle.

The slave gear 16 includes hydraulic fluid ports 76 and 78 in end caps 42 and 44, respectively. These ports open directly into passage 70. Low pressure hydraulic return line 80 connects the low pressure outlet port 38 in bearing cap 30 to port 76. Low pressure return line 82 connects port 78 to hydraulic fluid reservoir 18. Supply line 84 connects the reservoir to low pressure inlet port 22 of the power steering pump 12.

Figure 4:
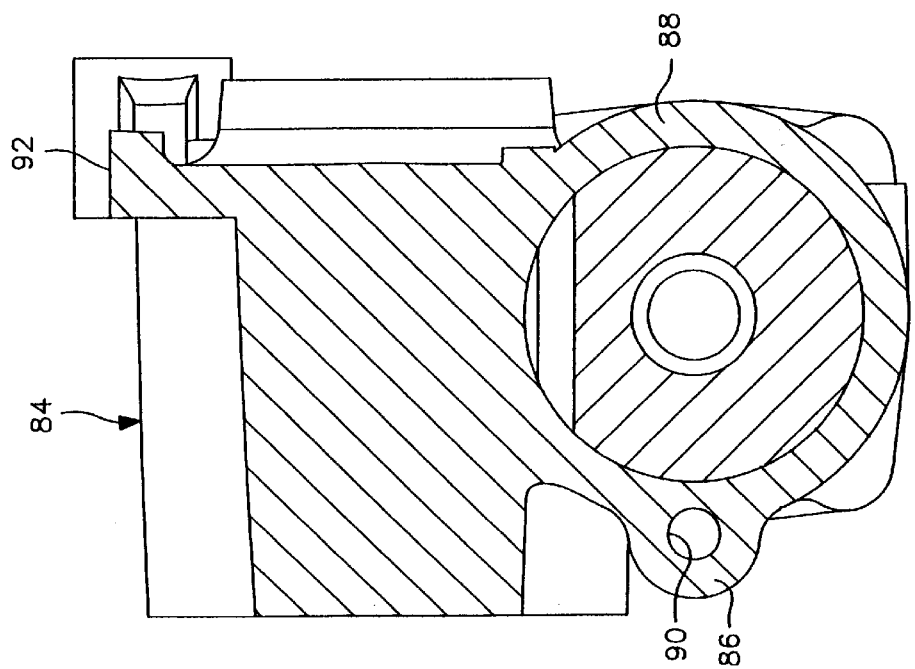
FIG. 4 is a sectional view similar to FIG. 3 showing a different embodiment slave power steering gear.

FIG. 4 illustrates slave gear 84 used in a second embodiment steering system. Gear 84 which is similar to slave gear 16 as previously described. Gear 84 includes a longitudinal ridge 86 extending along the length of cylinder body 88 with a heat transfer passage 90 located in the ridge. Passage 90 communicates with ports in the end caps of cylinder 84. These ports are like ports 76 and 78. Low pressure hydraulic fluid returning from bearing cap 30 flows through passage 98 prior to return to reservoir 18. Ridge and passage 86 and 90 are like ridge 70 and passage 72 in slave gear 16, previously described, with the exception that the ridge and passage are located on the side of the body 88 away from mounting plate 92. Plate 92 is like plate 54. The ridge 86 is located in this position in order to facilitate mounting the slave gear on the vehicle when there is insufficient space to locate the ridge and hydraulic fluid lines in the position across from the output shaft 48. If desired, the ridge may be positioned at other locations around the circumference of the body 88, to occupy available space on the vehicle.

Power steering pump 12 is rotated at a speed determined by engine speed. High pressure hydraulic fluid is flowed from port 20 through line 34 and port 36 to the rotary valve in master gear bearing cap 30. Pump 12 displaces hydraulic fluid at a high volume necessary to operate both the master and slave power steering gears in response to steering input. The volume displacement of the pump is twice the volume displacement of a power steering pump used to power a steering system with only a single power steering gear to provide steering assist.

When the vehicle is going straight down the road and not making turns and when the vehicle is stationary without turning the wheels, the high pressure hydraulic fluid from pump 24 flows into rotary valve and through the metering edges of the valve and returns at low pressure to the reservoir 18 through low pressure outlet port 38, low pressure return line 80, heat transfer passage 70 in the slave gear and low pressure return line 82.

The pressure drop in the large volumes of hydraulic fluid as it passes through the metering edges of the rotary valve produces considerable heat. This heat raises the temperature of bearing cap 30. The heated hydraulic fluid flows through port 38, line 80 and port 76 and through heat transfer passage 70. During transit through the slave gear, heat is flowed into the surrounding metal in end cap 60, ridge 72 and end cap 44. This heat transfer lowers the temperature of the hydraulic fluid and increases the temperature of the metal parts of the slave gear 16. The heat flows throughout the slave power cylinder and to the metal vehicle support member on which the gear is mounted and is dissipated to the atmosphere. In this way, the heat generated by flowing high pressure hydraulic fluid directly through the rotary valve in the master gear without shifting of the pistons in the two gears is extracted from the return flow of hydraulic fluid, heats the slave power steering gear and is dissipated. The heat transfer occurs as the heated hydraulic fluid flows along the length of the unobstructed heat transfer passage 70 and along the extensions of the passage formed in the end caps. The extraction of heat lowers the temperature of the hydraulic fluid flowed throughout the system and assures that the temperature of the steering system does not rise sufficiently to degrade the performance and durability of the steering system. The temperature of the cooled hydraulic fluid does not become sufficiently high to affect the temper of metal parts in the master cylinder.

Ridge 72 and passage 70 are easily and relatively inexpensively provided in the slave gear and are considerably less expensive then stand-alone heat coolers which are conventionally provided in power steering hydraulic lines to dissipate excess heat from the hydraulic fluid. Additionally, provision of the ridge and heat transfer passage in the body of the slave gear occupies considerably less space in the engine compartment of the vehicle than a stand-alone heat cooler which is preferably mounted in an air stream in order to remove heat from hydraulic fluid efficiently. The heat transfer passage is separate from the flow passages in the slave gear used to provide power assist.

Steering input rotation of actuation shaft 32 shifts the rotary valve to flow high pressure hydraulic fluid supplied by pump 12 to a chamber at one end of the piston in body 26. Fluid is also flowed to a chamber at the opposite end of the piston in slave gear body 40 through one of lines 62 or 68 so that the output shafts of both the master and slave gears are rotated in the same direction to provide power assisted rotation of the vehicle steering wheels.

Figure 5:
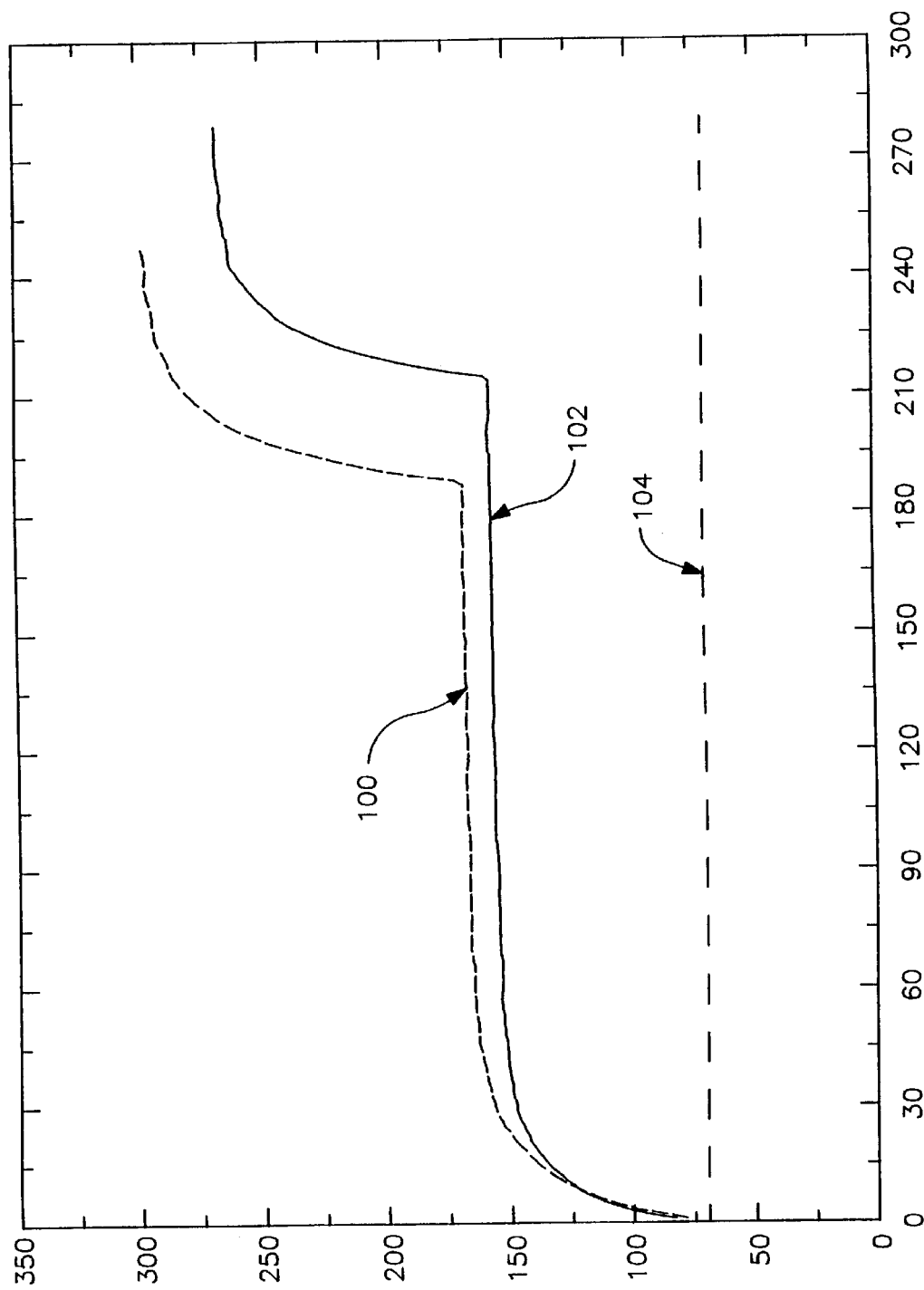
FIG. 5 are graphs illustrating the temperature of hydraulic fluid in a conventional tandem power steering system and in the disclosed tandem power steering system.

FIG. 5 is a temperature-time graph in which the vertical axis is temperature in degrees Fahrenheit and the horizontal axis shows time in minutes. Three traces are shown. Trace 100 shows the temperature of hydraulic fluid in a conventional tandem power steering system with a direct return line from the bearing cap outlet port to the hydraulic fluid reservoir. Trace 102 shows the temperature of hydraulic fluid in a tandem power steering system as disclosed with a return line including a heat transfer passage in the slave power gear. Trace 104 represents the ambient temperature during both of the tests represented by traces 100 and 102.

Trace 100 shows the temperature of hydraulic fluid circulating through a conventional power steering gear assembly in which the hydraulic fluid is returned directly from bearing cap outlet port 38 to reservoir 18. At the time the vehicle engine was started, the temperature of the hydraulic fluid was at ambient temperature, about 70° F. During the first 190 minutes of the test, the vehicle engine was idled at about 1200 rpm without turning the steering wheel. During this portion of the test, the temperature of the hydraulic fluid increased to about 170° F. After 190 minutes, the speed of the vehicle engine was increased to a maximum speed of about 2700 rpm. The increased engine speed more than doubled the output of the power steering pump and, as a result of the flow control within the pump, large quantities of hydraulic fluid are bypassed internally. Additionally, the flow required by a tandem or dual steering system has to be twice the flow required by a single gear. This additional flow, as well as the elevated RPM, results in additional heat being generated. The increased flow resulted in increased heat released in the valve which raised the temperature of the hydraulic fluid rapidly to a temperature of about 300° F. When the hydraulic fluid reached this temperature, the test was stopped in order to prevent further temperature increase and damage to the seals in the bearing cap end of the master power gear.

Trace 102 shows the temperature of hydraulic fluid in a tandem power steering system as disclosed in which return hydraulic fluid flows through a heat transfer passage in the slave power gear. In this test, the temperature of the hydraulic fluid increased from ambient and reached a temperature of about 160° F. when the engine idled at about 1200 rpm, 10° F. less than the idle temperature of trace 100. Increase of engine speed, without steering input, to a maximum speed of about 2700 rpm increased the temperature of the hydraulic fluid to about 270° F., 30° F. less than the temperature of the hydraulic fluid in a conventional steering system when the test was stopped, as indicated by graph 100.

The 30° F. reduction in temperature of the hydraulic fluid because of transfer of heat to the slave power gear reduces the likelihood that the hydraulic fluid will become sufficiently hot to injure the seals in the master power gear. Injury of seals can result in loss of hydraulic fluid and loss of power steering assist.

The invention has been described using a heat transfer passage in the length of the body of the slave steering gear. If desired, a comparable passage can be provided along the length of the body of the master cylinder so that low pressure hydraulic fluid flowed out from the rotary valve flows directly along the length of the master cylinder and heat from the hydraulic fluid is transferred to the metal of the master cylinder, thereby lowering the temperature of the hydraulic fluid and reducing the risk of high temperature injury to seals and possible loss of temper of metal parts in the cylinder. In some systems, return flow heat transfer passages may be provided in both gears. These passages are independent of the hydraulic passages used to provide steering assist.

The disclosed transfer passage 70 located in the slave gear 16 is particularly advantageous because the heat generated as the high pressure hydraulic fluid flows through the rotary valve is removed entirely from the master gear and is extracted and dissipated at the slave gear.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A tandem power steering system comprising,
   a) a power steering pump;
   b) a first power steering gear including a first body, a first piston in a first bore in the first body, a first output member connected to the first piston, a valve in the first body, first hydraulic fluid passages in the body connecting the valve to opposite ends of the first bore, a pair of first steering assist ports connected to opposite ends of the first bore respectively, a hydraulic fluid inlet port connected to the valve, and a hydraulic fluid outlet port connected to the valve;
   c) a second power steering gear including a second body, a second piston in a second bore in the second body, a second output member connected to the second piston, a pair of second steering assist outlet ports connected to opposed ends of the second bore, and a heat transfer passage in the second body;
   d) a hydraulic fluid reservoir; and
   e) a first hydraulic fluid line connecting the power steering pump to the inlet port, second and third hydraulic fluid lines connecting the first steering assist ports to the second steering assist ports, a fourth hydraulic fluid line connecting the outlet port to one end of the heat transfer passage, a fifth hydraulic line connecting a second end of heat transfer passage to the reservoir and a sixth hydraulic fluid line connecting the reservoir to the power steering pump.

2. A system as in claim 1 wherein the heat transfer passage extends along and to one side of the second bore.

3. A system as in claim 2 wherein the second body includes a ridge extending along the length of the second bore, and said heat transfer passage is located in the ridge.

4. A system as in claim 3 wherein the thickness of the body surrounding the passage is approximately equal to the transverse dimension of the passage.

5. A system as in claim 4 wherein said heat flow passage is cylindrical.

6. A system as in claim 1 wherein said second power steering gear includes end caps mounted on said second body closing the ends of the second bore, and said heat transfer passage extends through said end caps.

7. A system as in claim 6 including a ridge extending along the length of the second body, said heat flow passage located within said ridge.

8. A system as in claim 7 wherein said heat flow passage is cylindrical and the walls of said ridge have a thickness approximately equal to the diameter of said heat flow passage.

9. A system as in claim 1 wherein said second output number is located to one side of the second bore and said heat flow passage is located on another side of said second bore across from the output member.

10. A power steering gear including a body, a cylindrical bore in the body, a piston in the bore, end caps closing the opposed ends of the bore, hydraulic fluid passages in the body opening into the opposed ends of the bore to flow hydraulic fluid into and from the bore and move the piston back and forth in the bore, an output shaft rotatably mounted in the body adjacent to the bore, a rotary gear connection joining the shaft to the piston whereby movement of the piston back and forth in the bore rotates the output shaft, and a heat transfer passage formed in said body outside of said bore, said passage separate from said hydraulic fluid passages.

11. A gear as in claim 10 wherein said passage extends along the length of the bore and includes passage extensions formed through said end caps.

12. A gear as in claim 11 wherein said passage in the body is straight and extends parallel to the bore.

13. A gear as in claim 11 wherein said body includes a ridge extending along the length of the bore, said passage located within said ridge.

14. A gear as in claim 13 wherein said passage is cylindrical and the ridge has walls, the thickness of said walls approximately equaling the diameter of the passage.

15. A gear as in claim 14 including a rotary valve, a hydraulic fluid inlet port connected to the valve, and a hydraulic fluid outlet passage connecting to said valve to said heat transfer passage, and wherein said hydraulic fluid passages are connected to the valve.

* * * * *

UNITED STATES PATENT AND TRADEMARK OFFICE
CERTIFICATE OF CORRECTION

PATENT NO. : 5,810,110

DATED : September 22, 1998

INVENTOR(S) : Peter H. Sheppard

It is certified that error appears in the above-identified patent and that said Letters Patent is hereby corrected as shown below:

Column 2, line 24, change "withdraw" to --withdrawal--.
Column 2, line 43, change "protects" to --projects--.
Column 4, line 51, change "84" to --83--.
Column 4, line 55, delete "which".
Column 4, line 59, change "84" to --88--.
Column 5, line 19, change "24" to --12--.
Column 5, line 30, change "60" to --42--.
Column 5, line 54, change "then" to --than--.
Column 6, line 52, change "graph" to --trace--.

In the Claims:
Claim 9, line 2, change "number" to --member--.

Signed and Sealed this

Nineteenth Day of January, 1999

Attest:

Attesting Officer

*Acting Commissioner of Patents and Trademarks*